United States Patent [19]

Iwasaki et al.

[11] Patent Number: 6,115,536
[45] Date of Patent: *Sep. 5, 2000

[54] DATA RECORDING/REPRODUCING APPARATUS, DATA RECORDING/REPRODUCING METHOD AND DATA FORMAT

[75] Inventors: Yasuo Iwasaki; Satoshi Yoneya; Masakazu Yoshimoto; Satoshi Yutani, all of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,085

[22] Filed: Jan. 17, 1997

[30] Foreign Application Priority Data

Jan. 23, 1996 [JP] Japan .................................. 8-028469

[51] Int. Cl.7 .................................................. H04N 5/781
[52] U.S. Cl. .............................. 386/106; 386/92; 386/125
[58] Field of Search ............................... 386/92, 125, 126, 386/46, 124, 96, 105, 106, 39, 98; 360/22, 23, 32; H04N 5/781

[56] References Cited

U.S. PATENT DOCUMENTS

5,497,244  3/1996  Chargin, Jr. et al. .................... 386/125
5,754,730  5/1998  Windrem et al. ....................... 386/124

*Primary Examiner*—Robert Chevalier
*Attorney, Agent, or Firm*—Frommer Lawrence & Haug, LLP.; William S. Frommer; Bruno Polito

[57] ABSTRACT

Video data controllers and disk array units are connected with an independent input serial transmission line and an independent output serial transmission line. Data is serially transmitted between the video data controllers and the disk array units. Data of the video data controllers is sent with time slots assigned thereto. Data has a synchronous signal at the beginning thereof. The synchronous signal synchronizes with time slots. The synchronous signal is followed by commands/status and video data.

48 Claims, 6 Drawing Sheets

DATA RECORDING/REPRODUCING APPARATUS, DATA RECORDING/REPRODUCING METHOD AND DATA FORMAT

BACKGROUND OF THE INVENTION

1. Field of the Invention

The present invention relates to a data recording/reproducing apparatus, a data recording/reproducing method and a data format, in particular to, a data recording apparatus, a data recording/reproducing method and a data format suitable for inputting/outputting high quality video data on many channels.

2. Description of the Prior Art

Generally, in a data recording/reproducing apparatus such as a hard disk drive that randomly accesses data, data is asynchronously transmitted. In such a data recording/reproducing apparatus, a reproduction signal is processed with a clock signal reproduced from a disk that rotates. However, the rotation of the disk does not synchronize with a reference signal. In recently, some data recording/reproducing apparatuses have a structure of which the rotation of the disk synchronizes with an external signal. However, an interface of these apparatuses inputs/outputs data (generally, for example SCSI interface) with a common line for transmitting commands and data. Thus, the data transmission varies depending on data exchanged between an initiator and a target.

In addition, to improve the record density of hard disks, data record frequencies are varied corresponding to the record positions thereon. Thus, when a plurality of hard disk drives are operated, reproductions signals thereof may not synchronize with each other.

Thus, when data transmission rate or storage capacity is increased with a plurality of hard disk drives, data supplied from each hard disk drive should be temporarily stored in for example a memory and read as blocks.

However, in the case that such a process is performed with a data recording/reproducing apparatus that requires high picture quality, when data is recorded for a long time, high data transmission rate and large storage capacity are required. Thus, the number of hard disk drives should be operated in parallel increases.

For example, video data of for example D2 base band requires an execution transmission rate of around 120 Mbps per channel. When the transmission rate per hard disk drive is around 24 Mbps, five hard disk drives are required. For example, when the number of channels is six, 30 hard disk drives are required.

The execution transmission rate is a value of which a predetermined data amount is divided by a total time period necessary for reading/writing the data amount. In other words, the execution transmission rate is not a transmission rate of a hard disk drive, nor an instantaneous transmission rate of an interface portion. In addition, it is assumed that on each channel, a plurality or the same picture of the same recording/reproducing apparatus is reproduced or recorded.

However, it is not common to operate as many as 30 hard disk drives in parallel. When a number of hard disk drives are operated at the same time, the load of a portion that issues commands and manages the hard disk drives becomes large. Thus, since the process of this portion takes a long time, the execution transmission rate decreases or the reliability against failures of the hard disk drives deteriorates.

Conventionally, to solve such a problem, an apparatus is divided into a plurality of disk arrays. Data is distributed to a plurality of hard disk drives. In addition, parities calculated with the data are also used to secure redundancy. By operating a plurality of disk array units in parallel, the transmission rate is increased.

Figure 1:
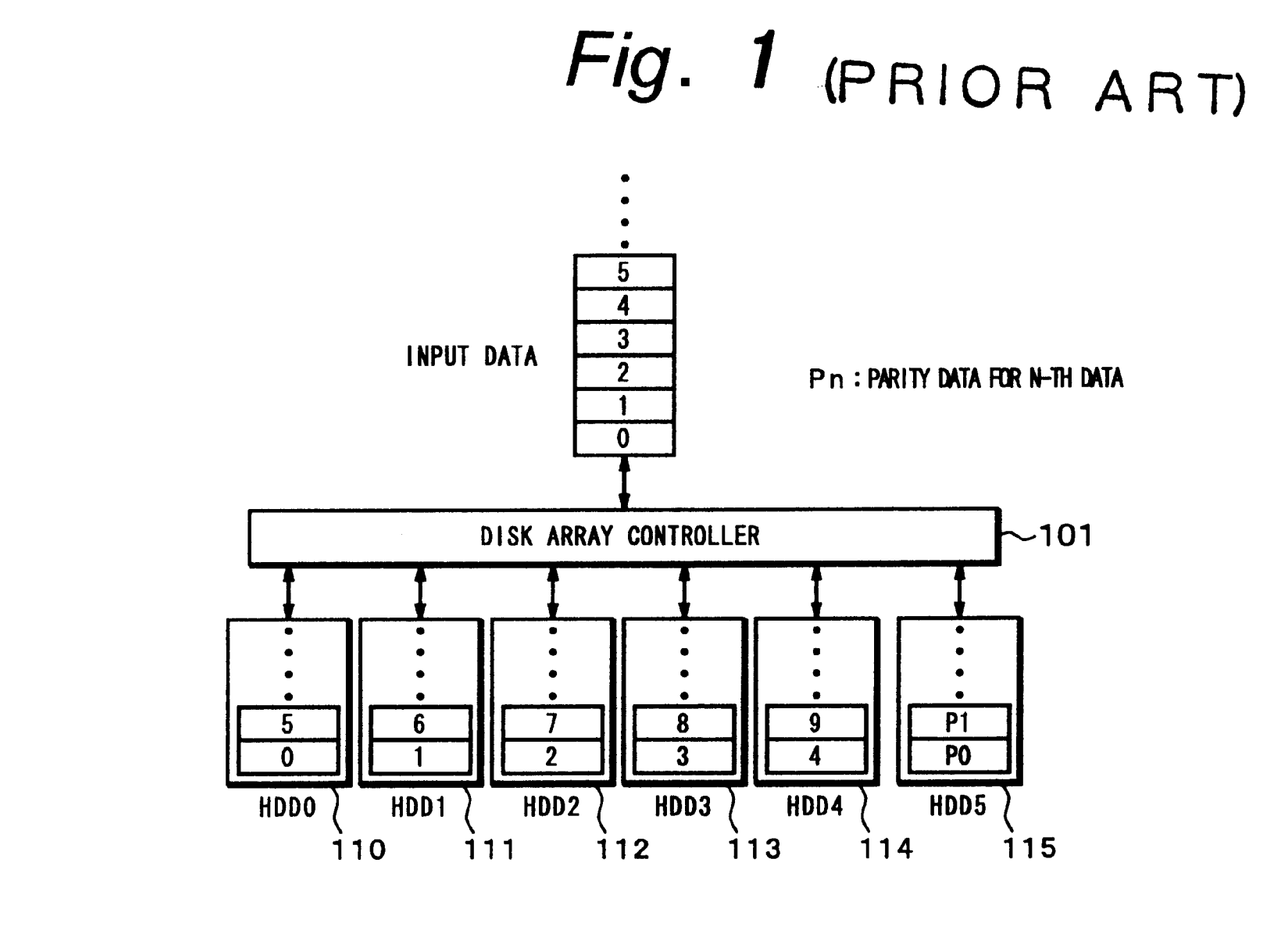
FIG. 1 is a schematic diagram showing the structure of a conventional disk array unit.

FIG. 1 is a schematic diagram showing the structure of a conventional disk array unit. As shown in FIG. 1, in the conventional disk array unit, a plurality of hard disk drives are connected to a disk array controller 101 (in this example, six hard disk drives 110 to 115 are connected). The hard disk drives 110 to 114 are used to record data. The disk array controller 101 assigns input data to the hard disk drives 110 to 114. The hard disk 115 records only parities calculated with the input data.

Figure 2:
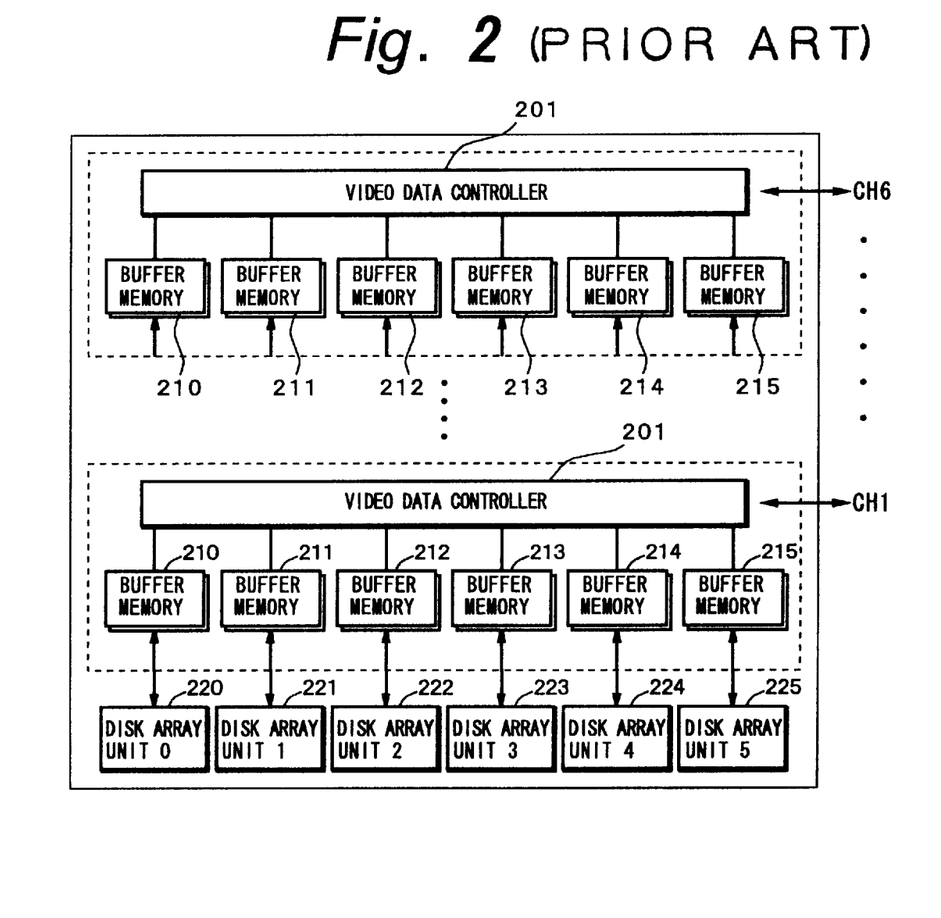
FIG. 2 is a s schematic diagram showing an example of the structure of a conventional data recording/reproducing apparatus.

To increase the transmission rate and storage capacity, a data recording/reproducing apparatus having a plurality of disk array units that operate in parallel has been proposed. FIG. 2 shows an example of the structure of this data recording/reproducing apparatus.

As shown in FIG. 2, in the conventional data recording/reproducing apparatus, video data controllers 201 are disposed corresponding to individual channels. Buffer memories 210 to 215 corresponding to individual disk array units 220 to 225 are connected to the video data controller 201. The buffer memories 210 to 215 of each channel are connected to individual disk array units 220 to 225 by a SCSI interface. The structure of each of the disk array units 220 to 225 is the same as the structure of the conventional disk array unit shown in FIG. 1.

However, in the conventional data recording/reproducing apparatus, a reproduction request issued by the video data controller 201 to the disk array units 220 to 225 does not chronologically synchronize with data obtained from the disk array units 220 to 225. Thus, to synchronize these data and restore data of one channel, the buffer memories 210 to 215 corresponding to the disk array units 220 to 225 for each channel and a memory control circuit (not shown) for the buffer memories 210 to 215 should be disposed. To prevent video data from discontinuing, the video data controller 201 should always monitor the data amount of the buffer memories 210 to 215 and issue a data transmission request to the disk array units 220 to 225 when the data amount decreases to a predetermined level. Thus, the structure of the data recording/reproducing apparatus becomes complicated and the cost thereof increases.

In addition, the apparatus should control the video data controllers 201 so that they do not issue commands to the disk array units 220 to 225 at the same time. Thus, since the use efficiency of the bus decreases, it is difficult to raise the execution transmission rate. In addition, although the disk array units 220 to 225 and the video data controller 201 are connected with a SCSI interface that has been commonly used as a standard hard disk drive interface, the SCSI interface is basically shared by a signal input and a signal output. Thus, when a record request and a reproduction request are issued from video data controllers 201 of different channels, a time to change the transmission direction is required. Thus, the transmission rate deteriorates.

In addition, for the SCSI interface, a 68-pin cable is required (depending on the applied standard, at least 50 pins are required). To construct a large-scaled system, a number of cables are required. In addition, since a number of connection points are required, the reliability deteriorates. Moreover, a large cabinet is required for the mounting area of the connectors. To transmit parallel data for a long distance, many drivers are required. Thus, the number of devices of the circuitry increases. Consequently, the area for the devices becomes large.

OBJECTS AND SUMMARY OF THE INVENTION

Therefore, an object of the present invention is to provide a data recording/reproducing apparatus, a data recording/reproducing method and a data format that allows data to be effectively transmitted in a simple, small, and low-cost structure.

According to an aspect of the present invention, there is provided a data recording/reproducing apparatus having a plurality of disk array units for recording/reproducing data, comprising: a plurality of data controlling portions for distributing input data to the disk array units; and an independent input serial transmission line and an independent output serial transmission line for inputting and outputting data between the plurality of data controlling portions and the disk array units, wherein the input data has a predetermined length and is divided into time slots corresponding to the number of the plurality of data controlling portions, the input data being supplied to the plurality of data controlling portions with the divided time slots, the plurality of data controlling portions operating with the divided time slots, and wherein each of the disk array units comprises: a plurality of randomly accessible record mediums; record data controlling means for separating the input data received from a relevant data controlling portion through the independent input serial transmission line into record data and additional data, the record data being recorded to the randomly accessible record mediums, the additional data being data other than the record data; a central controlling portion for inputting the additional data and outputting additional data corresponding to the reproduction operation of each of the disk array units when data is reproduced from the record mediums; and reproduction data controlling means for inputting reproduction data reproduced from the record mediums and the additional data corresponding to the reproduction operation, adding the additional data corresponding to the reproduction operations to the reproduction data, and outputting the resultant data to the corresponding data controlling portion through the independent output serial transmission line.

According to another aspect of the present invention, there is provided a data recording/reproducing method for causing a plurality of disk array units to record/reproduce data, comprising the steps of: (1) distributing input data into the disk array units with time slots corresponding to the number of a plurality of data controlling portions to which the input data is supplied; (2) supplying data that is output from each of the data controlling portions to each of the disk array units through an independent input serial transmission line disposed between each of the data controlling portions and each of the disk array units, the independent input serial transmission line composing a serial transmission line portion along with an independent output serial transmission line; (3) dividing the input data that is input at step (2) into record data and additional data, the record data being recorded on a plurality of randomly accessible record mediums that comprise each of the disk array units, the additional data being data other than the record data; (4) inputting the additional data and outputting additional data corresponding to a reproduction operation of which data is reproduced from each of the randomly accessible record mediums; and (5) inputting reproduction data reproduced from each of the record mediums and additional data corresponding to the reproduction operation, adding the additional data corresponding to the reproduction operation to the reproduction data, and outputting the resultant data to each of the data controlling portions through the independent output serial transmission line.

According to still another aspect of the present invention, there is provided a data format of data being input/output to/from a plurality of disk array units, wherein each of the disk array units has an independent input serial transmission line and an independent output transmission line that compose a serial transmission line portion, wherein data that is input/output to/from each of the disk array units through the serial transmission line portion is composed of data regions that are synchronous signal data, command data for causing each of the disk array units to perform a record operation and/or a reproduction operation, status data that represents the record state and/or reproduction state of each of the disk array units, and record and/or reproduction data for each of the disk array units.

According to the present invention, the input data having a predetermined length is divided into time slots corresponding to the number of the plurality of data controlling portions and is inputted by each of the plurality of data controlling portions with the divided time slots. In addition, the plurality of data controlling portions operates with the divided time slots to prevent the plurality of data controlling portions from reading/writing data from/to a common disk array unit at the same time. Thus, data can be effectively transmitted.

In addition, according to the present invention, the plurality of data controlling portions and the disk array units are connected with an independent input serial transmission line and an independent output serial transmission line. Since the mounting area for the connectors is small, the size of apparatus can be reduced. When data is reproduced from the disk array units, each of the disk array units operate nearly at the same time. Thus, the reproduction data synchronizes on the independent output serial transmission line. Therefore, unlike with the conventional structure, a buffer memory that synchronizes data is not required. Thus, the structure of the apparatus can be simplified and the cost thereof can be reduced.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 3:
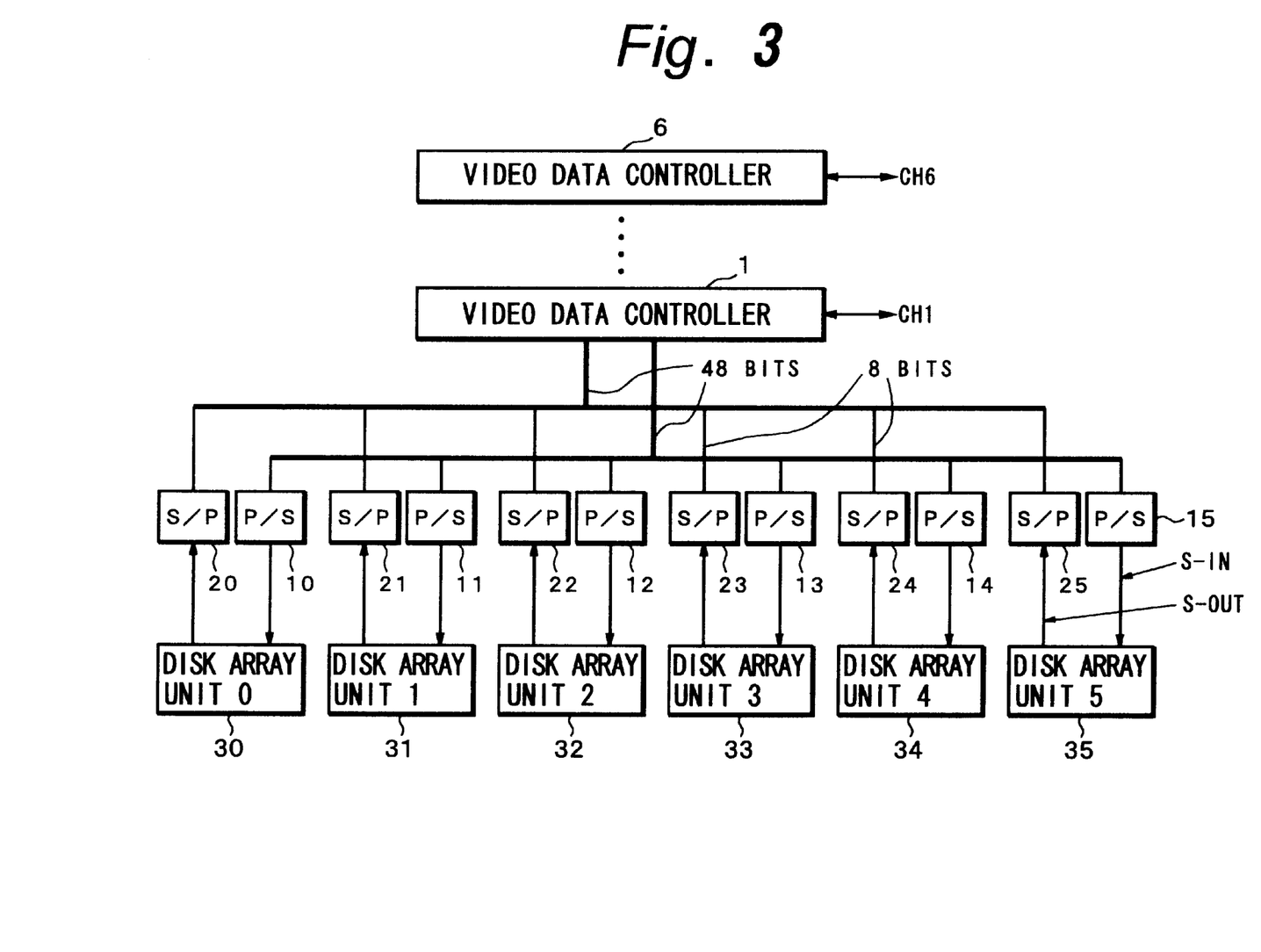
FIG. 3 is a schematic diagram showing an example of the structure of a data recording/reproducing apparatus according to the present invention.

Next, with reference to the accompanying drawings, an embodiment of the present invention will be described. FIG.

3 shows an example of the structure of a data recording/ reproducing apparatus according to the present invention. The data recording/reproducing apparatus according to the present invention can input and output high quality video data on a number of channels.

In other words, as shown in FIG. 3, the data recording/ reproducing apparatus according to the embodiment has video data controllers 1 to 6. The video data controllers 1 to 6 input/output video data of individual channels. The video data is data compressed corresponding to for example MPEG standard. In this embodiment, parallel/serial (P/S) converters 10 to 15 and serial/parallel (S/P) converters 20 to 25 are disposed. The video data controllers 1 to 6, the P/S converters 10 to 15, and the S/P converters 20 to 25 structure a data processing block. The data recording/reproducing apparatus according to the embodiment has a plurality of disk array units (in this example, disk array units 30 to 35).

The video data controllers 1 to 6 share a 48 bit independent input data bus and a 48-bit independent output data bus. Video data of the video data controllers 1 to 6 is supplied as 48-bit parallel data along with command data to the output data bus. In the output data bus, the video data is divided as eight-bit blocks and supplied to the P/S converters 10 to 15. Thereafter, the P/S converters 10 to 15 convert the parallel data into serial data and supplies the parallel data to the disk array units 30 to 35 through a serial transmission line S-IN. On the other hand, video data of the disk array units 30 to 35 is supplied as serial data along with status data to the S/P converters 20 to 25 through a serial transmission line S-OUT. The S/P converters 20 to 25 convert the serial data into eight-bit parallel data. The eight-bit parallel data is combined into 48-bit parallel data and supplied to the video data controllers 1 to 6 through the input data bus.

Since the serial transmission lines S-IN and S-OUT are independently disposed, from a view point of the disk array unites 30 to 35, a simultaneous operation of which data is received from the serial transmission line S-IN and data is sent to the serial transmission line S-OUT can be performed.

Figure 4:
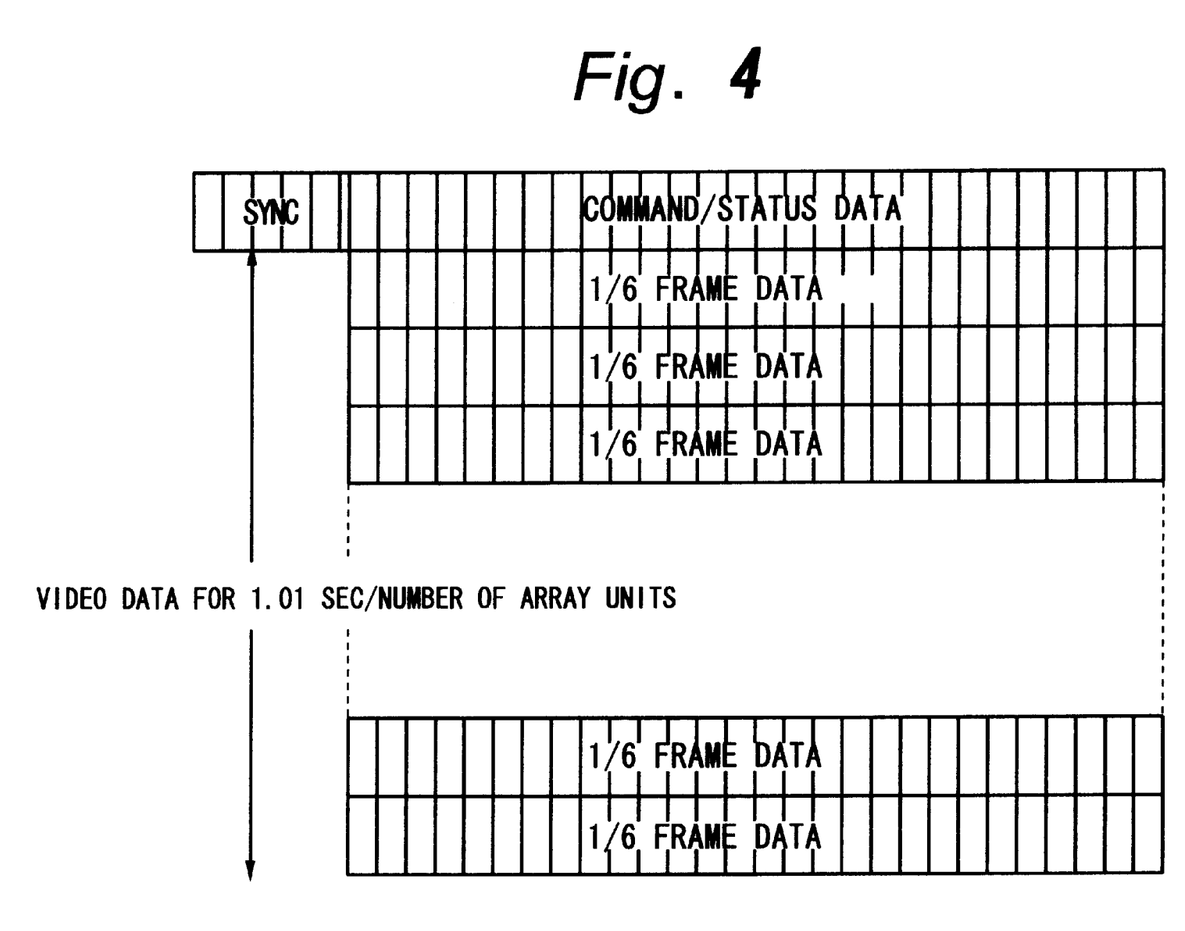
FIG. 4 is a schematic diagram showing a data format of the data recording/reproducing apparatus according to the present invention.

FIG. 4 shows a format of data transmitted with the serial transmission lines S-IN and S-OUT. The data has a-synchronous signal at the beginning thereof. The synchronous signal is followed by command data or status data that has a predetermined amount of data. The video data controllers 1 to 6 place commands for the disk array units 30 to 35 in the command data. In addition, the disk array units 30 to 35 place statuses corresponding to the commands or statuses representing the current situation in the status data and send the resultant data to the video controllers 1 to 6.

The command/status data is followed by video data for 1.01 sec (30 frames) that is equally divided by the number of disk array units 30 to 35 (namely, six units). The video data is sent from the video data controllers 1 to 6 to the disk array units 30 to 35 or from the disk array units 30 to 35 to the video data controllers 1 to 6.

Figure 5:
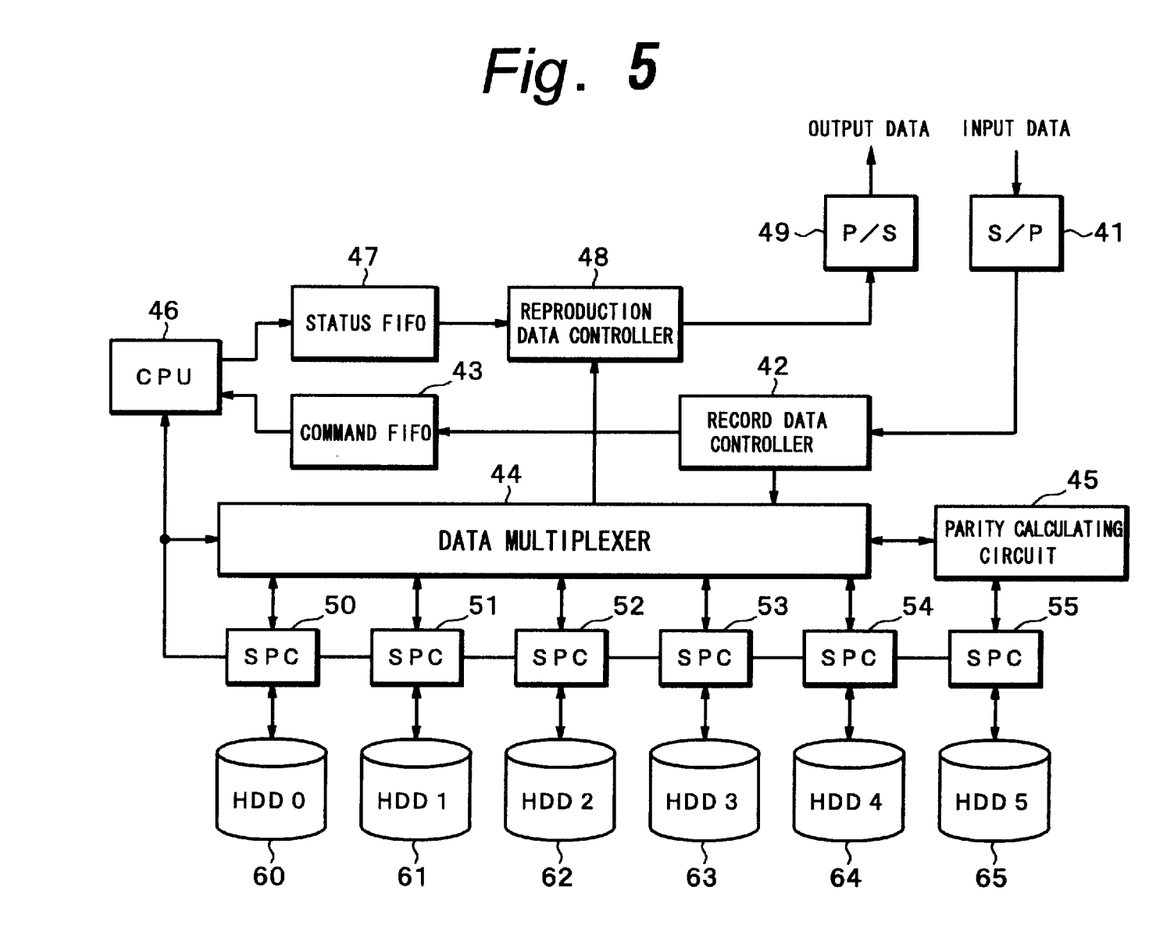
FIG. 5 is a schematic diagram showing an example of the structure of a disk array unit used in the data recording/reproducing apparatus according to the present invention.

FIG. 5 is a block diagram showing an example of the structure of a disk array unit used in the data recording/ reproducing apparatus according to the present invention. In the disk array unit according to the embodiment, when data is recorded, input data of a particular video data controller is supplied to an S/P converter 41 through a serial transmission line S-IN. The input data is composed of a synchronous signal, command data, and video data corresponding to the format shown in FIG. 4. The input data is converted into parallel data by an S/P converter 41 and supplied to a record data controller 42. When the record data controller 42 detects a synchronous signal at the beginning of the input data, command data preceded by the synchronous signal is supplied to a command FIFO 43.

On the other hand, video data preceded by the command data is supplied from the record data controller 42 to a data multiplexer 44. Hard disk drives 60 to 64 that record video data are connected to the data multiplexer 44 through respective SCSI protocol controllers (SPCS) 50 to 54. A parity calculating circuit 45 is connected to the data multiplexer 44. A hard disk drive 65 that records parity data is connected to the parity calculating circuit 45 through an SPC 55. The SPCs 50 to 55 are connected in series. One end of the SPCs 50 to 55 is connected to a CPU 46. The data multiplexer 44 distributes video data to the hard disk drives 60 to 64. The hard disk drives 60 to 64 record the distributed video data. At this point, parity data calculated by the parity calculating circuit 45 is recorded to the hard disk drive 65.

When a sequence of the record operations has been normally completed, the CPU 46 issues status data that represents that the sequence has been normally completed. After the status data is stored in a status FIFO 47, the status data is supplied to a reproduction data controller 48 at a predetermined timing. The reproduction data controller 48 generates a synchronous signal and adds status data to the synchronous data. The resultant data is supplied to a P/S converter 49. The synchronous signal and the status data are converted into serial data by the P/S converter 49. Information that represents that data has been recorded is sent to a relevant video data controller through the serial transmission line S-OUT.

When data is reproduced from the disk array unit according to the embodiment, command data that cause video data to be reproduced is supplied from a particular video data controller through the serial transmission line S-IN. Corresponding to the request of the command data, video data recorded in the hard disk drives 60 to 64 and parity data recorded in the hard disk drive 65 are read and they are combined by the data multiplexer 44. The resultant video data is supplied to the reproduction data controller 48. In addition, the CPU 46 generates status data corresponding to the reproduction operation. This status data is stored in the status FIFO 47. Thereafter, the status data is supplied to the reproduction data controller 48 at a predetermined timing. The reproduction data controller 48 generates a synchronous signal and adds status data and video data to the synchronous signal. The resultant data is supplied to the P/S converter 49. The P/S converter 49 converts the synchronous signal, status data, and video data into serial data. The serial data is output through the serial transmission line S-OUT.

Figure 6:
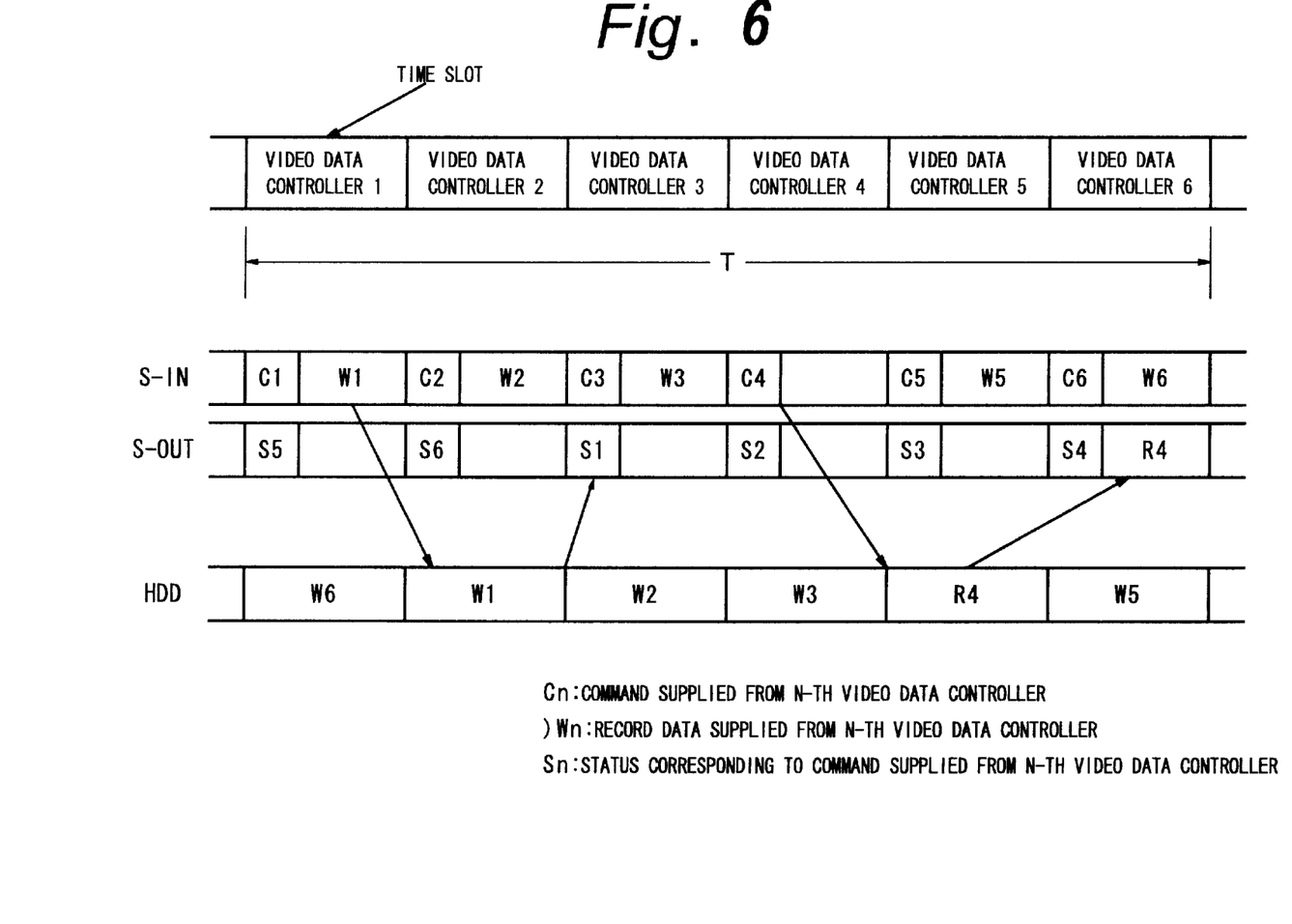
FIG. 6 is a timing chart showing an example of the operation of the data recording/reproducing apparatus according to the present invention.

FIG. 6 is a schematic diagram showing timings of which the video data controllers 1 to 6 of the data recording/ reproducing apparatus according to the embodiment of the present invention send data to the disk array units 30 to 35. As shown in FIG. 6, a time period for 1.01 seconds that is equivalent to 30 frames of video data is divided into time slots corresponding to the number of video data controllers being connected. The video data controllers are assigned to individual time slots. Thus, the video data controllers 1 to 6 are prevented from issuing data record/reproduction requests at the same time.

For example, when the video data controller 1 records video data, video data for 1.01 seconds (equivalent to 30 frames) stored in the memory is sent to the disk array units 30 to 35 through the serial transmission line S-IN. At this point, after the synchronous signal and command C1, video data W1 of which video data for 1.01 seconds is divided by the number of disk array units (in this case, six units) is sent to the disk array units 30 to 35 through the serial transmission line S-IN. In this example, the command C1 causes video data received thereafter to be recorded in the hard disk drives of the disk array units 30 to 35.

As described above, in the disk array units 30 to 35, when the command C1 is received, the video data W1 is distributed to the hard disk drives 60 to 64 by the data multiplexer 44. In addition, the parity data generated by the parity calculating circuit 45 is recorded to the hard disk drive 65. When the sequence of these operations has been normally completed, a status S1 that represents the normal completion of the sequence is added to the synchronous signal. The resultant signal is sent to the video data controller 1 through the serial transmission line S-OUT. Thus, the sequence of the operations is completed.

On the other hand, when the video data controller 4 reproduces video data R4 recorded in the disk array units 30 to 35, the video data controller 4 requests the disk array units 30 to 35 to reproduce the video data R4 with a command C4. Thus, as described above, the disk array units 30 to 35 read the video data R4 from the hard disk drives 60 to 64 therein. In contrast to the record operation, the distributed video data R4 is combined by a data multiplexer. The video data R4 is added to the synchronous signal and the status S4. Thereafter, the resultant data is sent through the reproduction data controller 48 and the serial transmission line S-OUT. The resultant data is converted into parallel data by an S/P converter and sent to the video data controller 4.

The video data R4 is read by the disk array units 30 to 35 nearly at the same time. Thus, the video data R4 synchronizes on the serial transmission line S-OUT. Consequently, from a view point of the video data controller 4, video data is sent through a high speed data bus. Thus, it is not necessary for the user to consider a plurality of disk array units and to perform complicated processes.

In this data recording/reproducing apparatus according to the embodiment, because of the following reason, the independent serial transmission lines S-IN and S-OUT are used. In other words, when the above-described operations are performed with a single serial transmission line, since the video data R4 corresponding to the command C4 is sent with a time slot assigned to the video data controller 4, a buffer memory that temporarily stores the video data R4 should be disposed. In addition, a control circuit that controls the operation for the buffer memory is required. Thus, the structure of the resultant circuit becomes complicated.

Although a single serial transmission line can be time-shared with a free time resulting from high speed record/reproduction operations, the high transmission rate obtained in the disk array structure cannot be effectively used.

As described above, according to the data recording/reproducing apparatus of the embodiment, since data reproduced from the disk array units 30 to 35 is synchronized, an extra control operation is not required unlike with the conventional structure. Moreover, in the disk array units 30 to 35, data is successively recorded or reproduced corresponding to commands received from the video data controllers 1 to 6. Thus, an extra buffer memory and its control are not required, thereby simplifying the structure of the apparatus and reducing the cost thereof.

In addition, since commands and data are simultaneously sent in a fixed format, the circuit of the interface portion is simple. Moreover, since video data, commands, and statuses of the video data controllers 1 to 6 are exchanged in time periods assigned with time slots, an arbitrating operation that prevents a plurality of video data controllers 1 to 6 from issuing commands at the same time and that prevents data from becoming discontinuous because of excessive access of the disk array units 30 to 35 by one of the video controllers 6 is not required. Thus, the apparatus can be simply controlled and data can be effectively sent.

Since the disk array unites 30 to 35 operate with reference to the synchronous signal received through the transmission line S-IN, it is not necessary to route excessive cables for time slots.

In addition, since the video data controllers 1 to 6 and the disk array units 30 to 35 are connected with the serial interface composed of the independent serial transmission lines S-IN and S-OUT, they can be easily connected. Moreover, the mounting area of the connectors is reduced in comparison with the structure of which many cables are used. Thus, the maintenance and inspection of the apparatus can be easily performed and troubles can be suppressed. In addition, the cost for the cables can be reduced.

In the above description, a real embodiment of the present invention has been described. However, the present invention is not limited to such an embodiment. Instead, various modifications can be made corresponding to the engineering concept of the present invention.

For example, in the above-described embodiment, the recording/reproducing block is composed of a plurality of disk array units 30 to 35. Instead, the recording/reproducing block may be composed of one disk array unit.

Moreover, in the above-described embodiment, record data/reproduction data may be data of which video data and audio data are mixed.

As described above, according to the present invention, the input data having a predetermined length is divided into time slots corresponding to the number of the plurality of data controlling portions and is inputted by each of the plurality of data controlling portions with the divided time slots. In addition, the plurality of data controlling portions operates with the divided time slots to prevent the plurality of data controlling portions from reading/writing data from/to a common disk array unit at the same time. Thus, data can be effectively transmitted.

In addition, according to the present invention, the plurality of data controlling portions and the disk array units are connected with an independent input serial transmission line and an independent output serial transmission line. Since the mounting area for the connectors is small, the size of apparatus can be reduced. When data is reproduced from the disk array units, each of the disk array units operate nearly at the same time. Thus, the reproduction data synchronizes on the independent output serial transmission line. Therefore, unlike with the conventional structure, a buffer memory that synchronizes data is not required. Thus, the structure of the apparatus can be simplified and the cost thereof can be reduced.

What is claimed is:

1. Data recording/reproducing apparatus having a plurality of disk array units for recording/reproducing data, comprising:

a plurality of data controlling portions for distributing input data to the disk array units; and an independent input serial transmission line and an independent output serial transmission line for inputting and outputting data between a said plurality of data controlling portions and the disk array units, wherein the input data has a predetermined length and is divided into time slots corresponding to the number of said plurality of data controlling portions, the input data being supplied to said plurality of data controlling portions with the divided time slots, said plurality of data controlling portions operating with the divided time slots, and wherein each of the disk array units comprises:

a plurality of randomly accessible record mediums;

record data controlling means for separating the input data received from a relevant data controlling portion through the independent input serial transmission line into record data and additional data, the record data being recorded to the randomly accessible record mediums, the additional data being data other than the record data;

a central controlling portion for inputting the additional data and outputting additional data corresponding to the reproduction operation of each of the disk array units when data is reproduced from the record mediums; and reproduction data controlling means for inputting reproduction data reproduced from the record mediums and the additional data corresponding to the reproduction operation, adding the additional data corresponding to the reproduction operations to the reproduction data, and outputting the resultant data to the corresponding data controlling portion through the independent output serial transmission line.

2. The data recording/reproducing apparatus as set forth in claim 1, wherein the record data to be recorded and the reproduction data reproduced from the disk array unit are an audio signal and/or a video signal, and wherein the additional data is command data for causing the disk array unit to record the record data.

3. The data recording/reproducing apparatus as set forth in claim 1, wherein the disk array unit further comprises:

a data multiplexer for inputting the record data received from the record data controlling means, distributing the record data to a plurality of the randomly accessible record mediums, combining the reproduction data reproduced from the randomly accessible record mediums, and outputting the resultant data as the reproduction data to the reproduction data controlling portion.

4. The data recording/reproducing apparatus as set forth in claim 1, wherein the central controlling means of each of the disk array units inputs the additional data, issues record completion status data that represents that the record data has been recorded to the record medium, and outputting the status data from the reproduction data controlling means to the data controlling portion through the independent output serial transmission line.

5. The data recording/reproducing apparatus as set forth in claim 1, wherein the central controlling means of each of the disk array units reads the reproduction data from the record mediums and outputs additional data corresponding to reproduction request addition data that causes data to be reproduced from the record mediums when the reproduction request additional data is input from the data controlling means through the record data controlling means.

6. The data recording/reproducing apparatus as set forth in claim 1, wherein the randomly accessible record mediums are hard disks, and wherein the disk array units are hard disk drives.

7. The data recording/reproducing apparatus as set forth in claim 1, wherein the randomly accessible record mediums are hard disks, and wherein each of the disk array units is composed of a plurality of recording/reproducing hard disk drives and a parity data recording/reproducing hard disk drive.

8. Data recording/reproducing apparatus having a plurality of disk array units for recording/reproducing data, comprising:

a plurality of data controlling portions for distributing input data to the disk array units; and an independent input serial transmission line and an independent output serial output transmission line for inputting and outputting data between a said plurality of data controlling portions and the disk array units, wherein the input data has a predetermined length and is divided into time slots corresponding to the number of said plurality of data controlling portions, the input data being supplied to said plurality of data controlling portions with the divided time slots, said plurality of data controlling portions operating with the divided time slots, and wherein each of the disk array units comprises:

a plurality of randomly accessible record mediums;

record data controlling means for detecting a synchronous signal in synchronization with the time slots, dividing the input data received from the data controlling portion through the independent input serial transmission line into record data and additional data corresponding to the synchronous signal, the record data being recorded to the randomly accessible record mediums, the additional data being other than the record data;

central controlling means for inputting the additional data and outputting additional data corresponding to the reproduction operation of each of the disk array units when data is reproduced from the record mediums; and reproduction data controlling means for inputting the reproduction data reproduced from the record mediums and the additional data corresponding to the reproduction operation, generating a synchronous signal, adding data corresponding to the reproduction operation to the synchronous signal, and outputting the resultant data to the data controlling portion through the independent output serial transmission line.

9. The data recording/reproducing apparatus as set forth in claim 8, wherein data that is input to the record data controlling means and/or data that is output from the reproduction data controlling means is composed of the synchronous signal, the additional data other than the record data or additional data corresponding to the reproduction operation, and the record data or the reproduction data disposed in the order.

10. The data recording/reproducing apparatus as set forth in claim 8, wherein the record data and the reproduction data are an audio signal and/or a video signal, and wherein the additional data other than the record data is command data for causing the disk array unit to record the record data.

11. The data recording/reproducing apparatus as set forth in claim 8,
wherein the disk array unit further comprises:
a data multiplexer for inputting the record data received from the record data controlling means, distributing the record data to the randomly accessible record mediums, combining the reproduction data reproduced from the randomly accessible record mediums, and outputting the resultant data as the reproduction data to the reproduction data controlling portion.

12. The data recording/reproducing apparatus as set forth in claim 8,
wherein the central controlling means of each of the disk array units inputs the additional data, issues record completion status data that represents that the record data has been recorded to the record medium, adding the record completion status data to the synchronous signal issued from the reproduction data controlling means, and outputting the resultant signal to the data controlling portion through the independent output serial transmission line.

13. The data recording/reproducing apparatus as set forth in claim 8,
wherein the central controlling means of each of the disk array units reads the reproduction data from the record mediums and outputs additional data corresponding to reproduction request addition data that causes data to be reproduced from the record mediums when the reproduction request additional data is input from the data controlling means through the record data controlling means along with the synchronous signal.

14. The data recording/reproducing apparatus as set forth in claim 8,
wherein the randomly accessible record mediums are hard disks, and
wherein the disk array units are hard disk drives.

15. The data recording/reproducing apparatus as set forth in claim 8,
wherein the randomly accessible record mediums are hard disks, and
wherein each of the disk array units is composed of a plurality of recording/reproducing hard disk drives and a parity data recording/reproducing hard disk drive.

16. Data recording/reproducing method for causing a plurality of disk array units to record/reproduce data, comprising the steps of:
(1) distributing input data into the disk array units with time slots corresponding to the number of a plurality of data controlling portions to which the input data is supplied;
(2) supplying data that is output from each of the data controlling portions to each of the disk array units through an independent input serial transmission line disposed between each of the data controlling portions and each of the disk array units, the independent input serial transmission line composing a serial transmission line portion along with an independent output serial transmission line;
(3) dividing the input data that is input at step (2) into record data and additional data, the record data being recorded on a plurality of randomly accessible record mediums that comprise each of the disk array units, the additional data being data other than the record data;
(4) inputting the additional data and outputting additional data corresponding to a reproduction operation of which data is reproduced from each of the randomly accessible record mediums; and
(5) inputting reproduction data reproduced from each of the record mediums and additional data corresponding to the reproduction operation, adding the additional data corresponding to the reproduction operation to the reproduction data, and outputting the resultant data to each of the data controlling portions through the independent output serial transmission line.

17. The data recording/reproducing method as set forth in claim 16,
wherein the record data to be recorded and the reproduction data reproduced from the disk array unit are an audio signal and/or a video signal, and
wherein the additional data is command data for causing the disk array unit to record the record data.

18. The data recording/reproducing method as set forth in claim 16, further comprising the step of:
supplying the record data that is output at step (8), distributing the record data to the randomly accessible record mediums, combining the reproduction data reproduced from the randomly accessible record mediums, and outputting the resultant data as the reproduction data to the step (3).

19. The data recording/reproducing method as set forth in claim 16,
wherein the step (4) is performed by inputting the additional data other than the record data at the step (3) and outputting a record completion status data that represents that the record data has been recorded to the record mediums to the data controlling portions through the independent output serial transmission line.

20. The data recording/reproducing method as set forth in claim 16,
wherein the step (4) is performed by reading the reproduction data from each of the record mediums and outputting additional data corresponding to the reproduction operation when reproduction request additional data for causing data to be reproduced form the record medium is input from the data controlling means through the independent input serial transmission line.

21. The data recording/reproducing method as set forth in claim 16,
wherein the randomly accessible record mediums are hard disks, and
wherein the disk array units are hard disk drives.

22. The data recording/reproducing method as set forth in claim 16,
wherein the randomly accessible record mediums are hard disks, and
wherein each of the disk array units is composed of a plurality of recording/reproducing hard disk drives and a parity data recording/reproducing hard disk drive.

23. Data recording/reproducing method for causing a plurality of disk array units to record/reproduce data, comprising the steps of:
(1) distributing input data into the disk array units with time slots corresponding to the number of a plurality of data controlling portions to which the input data is supplied;
(2) supplying data that is output from each of the data controlling portions to each of the disk array units through an independent input serial transmission line disposed between each of the data controlling portions and each of the disk array units, the independent input serial transmission line composing a serial transmission line portion along with an independent output serial transmission line;

(3) detecting a synchronous signal that is added to the input data at the step (2) and that synchronizes with the time slots and dividing the input data into record data and additional data corresponding to the synchronous signal, the record data being recorded to a plurality of randomly accessible record mediums, the additional data being data other than the record data;

(4) inputting the additional data and outputting additional data corresponding to a reproduction operation of which data is reproduced from each of the randomly accessible record mediums; and (5) inputting reproduction data reproduced from each of the record mediums and additional data corresponding to the reproduction operation, generating the synchronous signal, adding the reproduction data and the additional data corresponding to the reproduction operation to the synchronous signal, and outputting the resultant data to each of the data controlling portions through the independent output serial transmission line.

24. The data recording/reproducing method as set forth in claim 23, wherein data that is input/output through the independent input serial transmission line and/or the independent output serial transmission line is composed of the synchronous signal, additional data other than the record data or additional data corresponding to the reproduction operation, and record data or reproduction data.

25. The data recording/reproducing method as set forth in claim 23, wherein the record data and the reproduction data are an audio signal and/or a video signal, and wherein the additional data is command data for causing the disk array unit to record the record data.

26. The data recording/reproducing method as set forth in claim 23, further comprising the step of:

inputting the record data that is output at the step (3), distributing the record data to the randomly accessible record mediums, inputting the reproduction data reproduced from each of the record mediums, combining the reproduction data, and outputting the combined data to the step (3).

27. The data recording/reproducing method as set forth in claim 23, wherein the step (4) is performed by inputting the additional data other than the record data obtained at the step (3), outputting record completion status data that represents the record operation of each of the record mediums has been completed to each of the record mediums, and outputting the record completion status data to each of the data controlling portions through the independent output serial transmission line.

28. The data recording/reproducing method as set forth in claim 23, wherein the step (4) is performed by reading the reproduction data form each of the record mediums and outputting the reproduction data corresponding to reproduction request additional data for causing data to be reproduced from each of the record mediums when the reproduction request additional data is input from each of the data controlling means through the independent input serial transmission line.

29. The data recording/reproducing method as set forth in claim 23, wherein the randomly accessible record mediums are hard disks, and wherein the disk array units are hard disk drives.

30. The data recording/reproducing method as set forth in claim 23, wherein the randomly accessible record mediums are hard disks, and wherein each of the disk array units is composed of a plurality of recording/reproducing hard disk drives and a parity data recording/reproducing hard disk drive.

31. A data format of data being input/output to/from a plurality of disk array units, wherein each of the disk array units has an independent input serial transmission line and an independent output transmission line that compose a serial transmission line portion, wherein data that is input/output to/from each of the disk array units through the serial transmission line portion is composed of data regions that are synchronous signal data, command data for causing each of the disk array units to perform a record operation and/or a reproduction operation, status data that represents the record state and/or reproduction state of each of the disk array units, and record and/or reproduction data for each of the disk array units, and wherein data is input/output to/from said disk array units in response to requests from a plurality of video controllers, and wherein the data associated with said video controllers is assigned to respective cyclical time slots of equal duration such that for each video controller the data associated therewith is recorded/read to/from said disk arrays only during the time slot associated with said video controller and said time slots do not overlap.

32. The data format as set forth in claim 31, wherein the data regions are structured in the order of the synchronous signal data, the command data or the status data, and record data and/or reproduction data.

33. The data format as set forth in claim 31, wherein the predetermined time slots are time slots corresponding to the number of the disk array units.

34. The data format as set forth in claim 31, wherein each of the disk array units records/reproduces the record data and/or the reproduction data corresponding to the synchronous signal.

35. The data format as set forth in claim 31, wherein data that is input/output through the serial transmission line portion is audio data and/or video data.

36. Data recording/reproducing apparatus having a plurality of disk array units for recording/reproducing data, comprising:

a plurality of data controllers for distributing input data to the disk array units; and an independent input serial transmission line and an independent output serial transmission line for inputting and outputting data between said plurality of data controllers and the disk array units, wherein the input data has a predetermined length and is divided into time slots corresponding to the number of said plurality of data controllers, the input data being supplied to said plurality of data controllers with the divided time slots, said plurality of data controllers operating with the divided time slots, and wherein each of the disk array units comprises:

a plurality of hard disks;

a record data controller for separating the input data received from a relevant data controller through the independent input serial transmission line into record data and additional data, the record data being recorded to the hard disks, the additional data being data other than the record data;

a central processing unit for inputting the additional data and outputting additional data corresponding to the reproduction operation of each of the disk array units when data is reproduced from the hard disks; and a reproduction data controller for inputting reproduction data reproduced from the hard disks and the additional data corresponding to the reproduction operation, adding the additional data corresponding to the reproduction operations to the reproduction data, and outputting the resultant data to the corresponding data controller through the independent output serial transmission line.

37. The data recording/reproducing apparatus as set forth in claim 36, wherein the record data to be recorded and the reproduction data reproduced from the disk array unit are an audio signal and/or a video signal, and wherein the additional data is command data for causing the disk array unit to record the record data.

38. The data recording/reproducing apparatus as set forth in claim 36, wherein the disk array unit further comprises:
a data multiplexer for inputting the record data received from the record data controller, distributing the record data to the hard disks, combining the reproduction data reproduced from the hard disks, and outputting the resultant data as the reproduction data to the reproduction data controller.

39. The data recording/reproducing apparatus as set forth in claim 36, wherein the central processing unit of each of the disk array units inputs the additional data, issues record completion status data that represents that the record data has been recorded to the hard disks, and outputting the status data from the reproduction data controller to the data controller through the independent output serial transmission line.

40. The data recording/reproducing apparatus as set forth in claim 36, wherein the central processing unit of each of the disk array units reads the reproduction data from the hard disks and outputs additional data corresponding to reproduction request addition data that causes data to be reproduced from the hard disks when the reproduction request additional data is input from the data controller through the record data controller.

41. The data recording/reproducing apparatus as set forth in claim 36, wherein each of the disk array units is composed of a plurality of recording/reproducing hard disk drives and a parity data recording/reproducing hard disk drive.

42. Data recording/reproducing apparatus having a plurality of disk array units for recording/reproducing data, comprising:

a plurality of data controllers for distributing input data to the disk array units; and an independent input serial transmission line and an independent output serial output transmission line for inputting and outputting data between said plurality of data controllers and the disk array units, wherein the input data has a predetermined length and is divided into time slots corresponding to the number of said plurality of data controllers, the input data being supplied to said plurality of data controllers with the divided time slots, said plurality of data controllers operating with the divided time slots, and wherein each of the disk array units comprises:
a plurality of hard disks;
a record data controller for detecting a synchronous signal in synchronization with the time slots, dividing the input data received from the data controller through the independent input serial transmission line into record data and additional data corresponding to the synchronous signal, the record data being recorded to the hard disks, the additional data being other than the record data;

a central processing unit for inputting the additional data and outputting additional data corresponding to the reproduction operation of each of the disk array units when data is reproduced from the hard disks; and a reproduction data controller for inputting the reproduction data reproduced from the hard disks and the additional data corresponding to the reproduction operation, generating a synchronous signal, adding data corresponding to the reproduction operation to the synchronous signal, and outputting the resultant data to the data controller through the independent output serial transmission line.

43. The data recording/reproducing apparatus as set forth in claim 42, wherein data that is input to the record data controller and/or data that is output from the reproduction data controller is composed of the synchronous signal, the additional data other than the record data or additional data corresponding to the reproduction operation, and the record data or the reproduction data disposed in that order.

44. The data recording/reproducing apparatus as set forth in claim 42, wherein the record data and the reproduction data are an audio signal and/or a video signal, and wherein the additional data other than the record data is command data for causing the disk array unit to record the record data.

45. The data recording/reproducing apparatus as set forth in claim 42, wherein the disk array unit further comprises:
a data multiplexer for inputting the record data received from the record data controller, distributing the record data to the hard disks, combining the reproduction data reproduced from the hard disks, and outputting the resultant data as the reproduction data to the reproduction data controller.

46. The data recording/reproducing apparatus as set forth in claim 42, wherein the central processing unit of each of the disk array units inputs the additional data, issues record completion status data that represents that the record data has been recorded to the hard disks, adding the record completion status data to the synchronous signal issued from the reproduction data controller, and outputting the resultant signal to the data controller through the independent output serial transmission line.

47. The data recording/reproducing apparatus as set forth in claim 42, wherein the central processing unit of each of the disk array units reads the reproduction data from the hard disks and outputs additional data corresponding to reproduction request additional data that causes data to be reproduced from the hard disks when the reproduction request additional data is input from the data controller through the record data controller along with the synchronous signal.

48. The data recording/reproducing apparatus as set forth in claim 42, wherein each of the disk array units is composed of a plurality of recording/reproducing hard disk drives and a parity data recording/reproducing hard disk drive.

* * * * *